(12) United States Patent
Ammundi et al.

(10) Patent No.: US 10,033,698 B2
(45) Date of Patent: *Jul. 24, 2018

(54) INTRA-TERM LOGICAL OR OPERATION IN A NETWORK FILTER

(71) Applicant: Juniper Networks, Inc., Sunnyvale, CA (US)

(72) Inventors: Anand Ammundi, Cupertino, CA (US); Atul Mahamuni, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/228,455

(22) Filed: Aug. 4, 2016

(65) Prior Publication Data

US 2016/0344697 A1    Nov. 24, 2016

Related U.S. Application Data

(63) Continuation of application No. 12/352,856, filed on Jan. 13, 2009, now Pat. No. 9,413,662.

(51) Int. Cl.
*H04L 29/06* (2006.01)
*H04L 12/743* (2013.01)
(Continued)

(52) U.S. Cl.
CPC .... *H04L 63/0263* (2013.01); *G06F 17/30982* (2013.01); *G11C 15/00* (2013.01); *H04L 45/54* (2013.01); *H04L 45/7457* (2013.01)

(58) Field of Classification Search
CPC ...... G06F 12/00; G06F 12/08–12/0897; G06F 17/30982–17/30985; G11C 15/00;
(Continued)

(56) References Cited

U.S. PATENT DOCUMENTS 7,643,353 B1    1/2010 Srinivasan et al.
9,413,662 B1    8/2016 Ammundi et al.
(Continued)

OTHER PUBLICATIONS

Dong et al. "Packet Classifiers in Ternary CAMs Can Be Smaller". SIGMETRICS '06/Performance '06 Proceedings of the joint international conference on Measurement and modeling of computer systems; vol. 34 Issue 1; pp. 311-322. doi>10.1145/1140277.1140313. Published: Jun. 2006.*

(Continued)

*Primary Examiner* — Kevin Bechtel
(74) *Attorney, Agent, or Firm* — Harrity & Harrity, LLP

(57) ABSTRACT

A network filter is implemented so that filter terms that include intra-term OR conditions and converted to sub-terms that include only logical AND conditions. In one implementation, a device may include logic to receive a filter definition including one or more terms, at least some of the terms including logical OR conditions, that define how network traffic through the device is to be filtered, the logic expanding the one or more terms in the filter such that terms that contain logical OR conditions are expanded into a plurality of sub-terms that each contains only logical AND conditions. The device may further include a ternary content-addressable memory (TCAM) programmed to include a separate entry corresponding to each of the sub-terms.

20 Claims, 8 Drawing Sheets

(51) Int. Cl.
*G06F 17/30* (2006.01)
*H04L 12/741* (2013.01)
*G11C 15/00* (2006.01)

(58) Field of Classification Search
CPC ....... G11C 15/04–15/046; H04L 45/54; H04L 45/74; H04L 45/745–45/748; H04L 63/0263
See application file for complete search history.

(56) References Cited

U.S. PATENT DOCUMENTS

| | | | |
|---|---|---|---|
| 2003/0233516 | A1 | 12/2003 | Davis et al. |
| 2005/0010612 | A1* | 1/2005 | Enderwick .......... H04L 45/7453 |
| 2005/0226235 | A1 | 10/2005 | Kumar et al. |
| 2005/0262295 | A1 | 11/2005 | Nataraj et al. |
| 2006/0262583 | A1 | 11/2006 | Venkatachary |
| 2007/0288488 | A1 | 12/2007 | Rohrs et al. |
| 2008/0205403 | A1 | 8/2008 | Akyol et al. |
| 2009/0199266 | A1 | 8/2009 | Kling et al. |

OTHER PUBLICATIONS

Srinivasan et al. "Fast and scalable layer four switching". SIGCOMM '98 Proceedings of the ACM SIGCOMM '98 conference on Applications, technologies, architectures, and protocols for computer communication; vol. 28 Issue 4; pp. 191-202. doi>10.1145/285237.285282. Published: Oct. 1998.*

Dong et al., "Packet Classifiers in Ternary CAMs Can Be Smaller," SIGMetrics/Performance '06 Proceedings of the joint international conference on Measurement and modeling of computer systems, Jun. 26-30, 2006, Saint Malo, France, ISBN:1-59593-319-0, DOI: 10.1145/1140277.1140313, Jun. 2006, pp. 311-322.

* cited by examiner

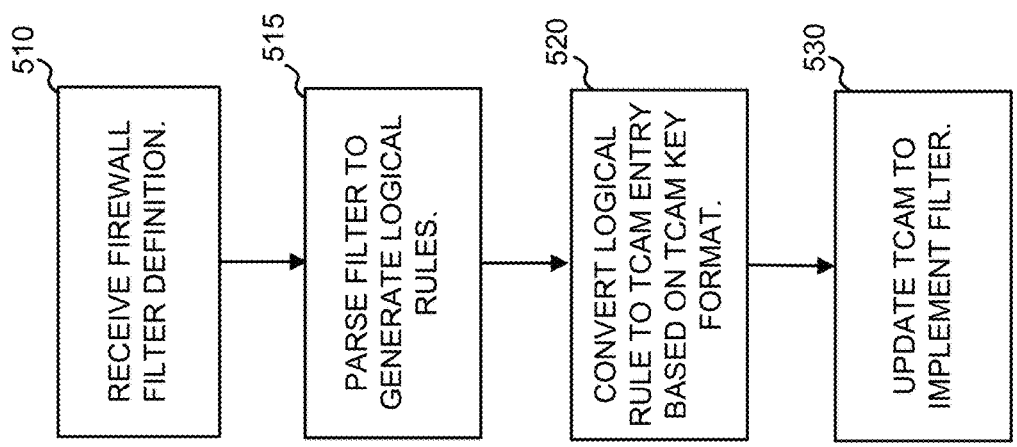

T1 {  [match IP Source Address 1.1.1.1 ~610
      match source port 100] ~615
      action counter ~620
   }

T2 {  [match IP Source Address 2.2.2.2 ~630
      match IP Source Address 3.3.3.3 ~635
      match source port 200 ~640
      match protocol UDP] ~645
      action discard ~650
   }

T3 {  [match IP Source Address 2.2.2.12
      match IP Source Address 3.3.3.13
      match source port 200
      match source port 210
      match destination port 220]
      action discard
   }

INTRA-TERM LOGICAL OR OPERATION IN A NETWORK FILTER

RELATED APPLICATION

This application is a continuation of U.S. patent application Ser. No. 12/352,856, filed Jan. 13, 2009 (now U.S. Pat. No. 9,413,662), which is incorporated herein by reference.

BACKGROUND

Computing and communication networks typically include devices, such as routers, switches or gateways, which transfer or switch data, such as packets, from one or more sources to one or more destinations. A packet is a structure that encapsulates data for transmission through a network based on control information that is stored in a header portion of the packet. A router is a switching device that can receive a packet and, based on the packet header, may forward the packet towards its final destination.

A firewall is a device that inspects network traffic passing through it, and may perform actions, such as denying or permitting passage of the traffic based on a set of rules. Firewalls may be implemented as stand alone network devices or, in some cases, integrated in a single network device, such as a router or switch, that performs other functions. For instance, a network switch may perform firewall related functions as well as switching functions.

SUMMARY

One implementation is directed to a device may include logic to receive a filter definition including one or more terms, at least some of the terms including logical OR conditions, that define how network traffic through the device is to be filtered. The logic expands the one or more terms in the filter such that terms that contain logical OR conditions are expanded into sub-terms that each contains only logical AND conditions. A ternary content-addressable memory (TCAM) may be programmed to include a separate entry corresponding to each of the sub-terms.

Another implementation is directed to a method that may include receiving a filter definition including one or more terms that define how network traffic is to be filtered; identifying a term that contains a logical OR condition; expanding terms that contain the logical OR condition into a number of sub-terms that each contains only logical AND conditions; generating entries for a ternary content-addressable memory (TCAM) based on the expanded one or more terms; and storing the entries in the TCAM.

In another implementation, a network device may include a TCAM programmed to include a plurality of entries that represent a network data filter, where terms from the filter that contain logical OR operations are stored in the TCAM as a plurality of entries where each entry contains only logical AND conditions.

BRIEF DESCRIPTION OF THE DRAWINGS

The accompanying drawings, which are incorporated in and constitute a part of this specification, illustrate one or more embodiments described here and, together with the description, explain these embodiments. In the drawings:

FIG. 5 is a flow chart illustrating exemplary operations through which a firewall may configure itself;

FIGS. 6A and 6B are diagrams illustrating an exemplary firewall filter;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network device, such as a firewall, may be configured to filter network traffic. The filter may be specified using logical OR conditions, such as a filter that performs an action when a data unit is received at, for example, a first port or a second port. Terms in the filter with logical OR conditions may be expanded into sub-terms such that each sub-term is based only on logical AND conditions.

Exemplary System Overview

Figure 1:
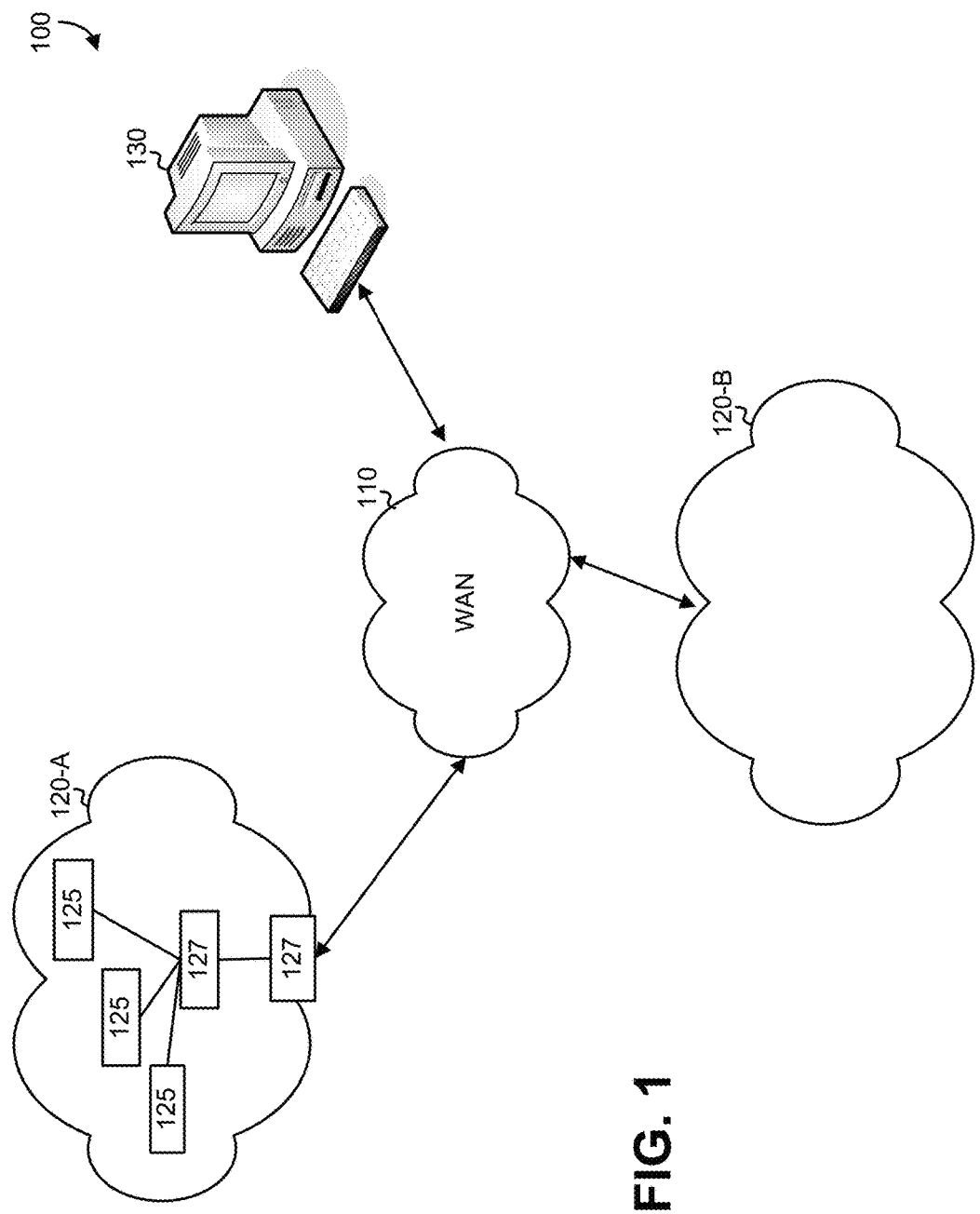
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these networks that that are used to transport data. Although shown as a single element in FIG. 1, WAN 110 may include a number of separate networks that function to provide services to private networks 120 and computing devices, such as computing device 130.

Private networks 120 may each include a number of computing devices, such as, for example, client computing stations 125, and network devices 127. Client computing stations 125 may include computing devices of end-users, such as desktop computers or laptops. Network devices 127 may include, for example, firewalls, switches, routers, combinations of these devices, or other devices relating to network implementation, control, and/or security.

Computing device 130 may include, for example, a laptop or personal computer connected to WAN 110. Alternatively, computing device 130 may include a mobile device, such as a cell phone, etc.

In the exemplary system shown in FIG. 1, two private networks 120-A and 120-B and one computing device 130 are shown. In other implementations, system 100 may include additional, fewer, different, or differently arranged networks and/or devices.

Exemplary Device Architecture

Figure 2:
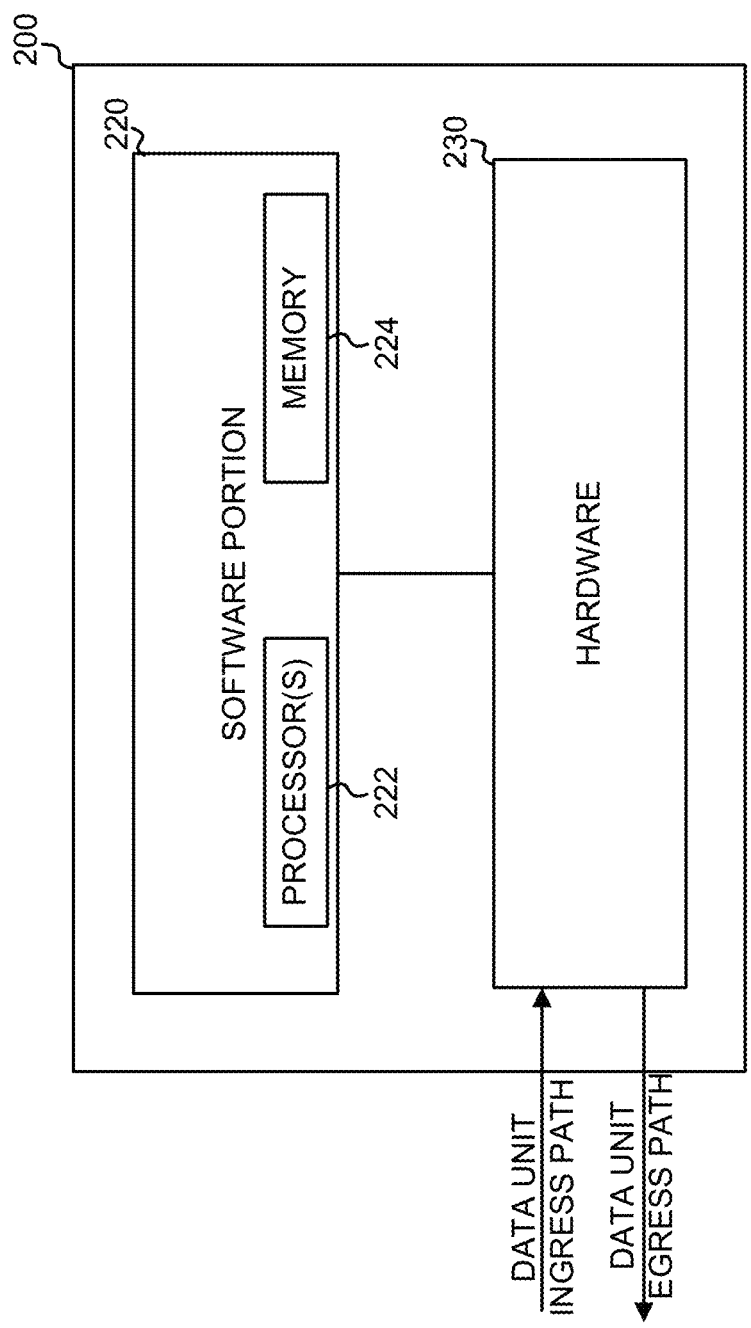
FIG. 2 is a block diagram of an exemplary firewall.

In one exemplary implementation, network devices 127 may include functionality relating to network data inspection (e.g., a firewall). FIG. 2 is a block diagram of an exemplary firewall 200, which may correspond to one of network devices 127 that is a dedicated firewall or includes an integrated firewall. In order to increase its throughput, firewall 200 may use dedicated hardware to process or assist in processing incoming data units, where a data unit is defined as packet-based or non-packet based information. As shown in FIG. 2, firewall 200 may include software portion 220 and hardware portion 230.

Software portion 220 may include software designed to control firewall 200. For example, software portion 220 may control hardware portion 230 and provide an interface for user configuration of firewall 200. In general, software portion 220 may implement the functions of the firewall that are not time critical. Software portion 220, although shown as a single abstract block 220 in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), or another type of dynamic or static storage device that may store information and instructions for execution by processors 222.

Hardware portion 230 may include circuitry for efficiently processing data units received by network device 200. Hardware portion 230 may include, for example, logic, such as an application specific integrated circuit (ASIC), a field programmable gate array (FPGA), and/or a content-addressable memory (CAM). Hardware portion 230 may, for example, receive incoming data units, extract header information for the data units, and process the data units based on the extracted header information.

It can be appreciated that although firewall 200 is shown as including a software portion 220 and a hardware portion 230, firewall 200 may, in some implementations, be implemented entirely through hardware.

Firewall 200 may inspect network traffic passing through the device and may perform actions, such as to deny or permit passage of the traffic based on rules defined for the firewall. To maximize the bandwidth of the firewall, the comparison of the incoming traffic to the firewall rules may be made in hardware portion 230.

Figure 3:
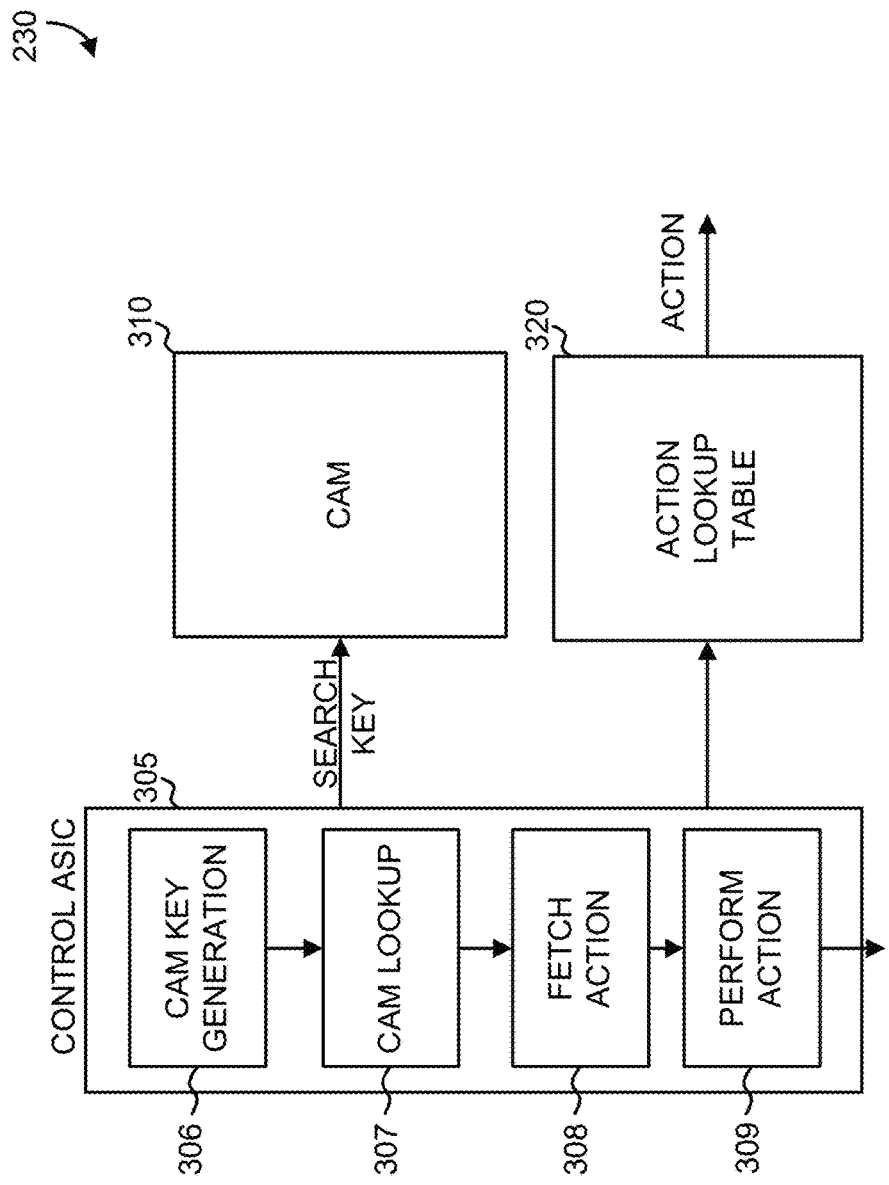
FIG. 3 is a diagram illustrating components in a hardware portion of a firewall that may be used by the firewall in inspecting network traffic.

FIG. 3 is a diagram illustrating components in hardware portion 230 that may be used by firewall 200 in inspecting network traffic. Hardware portion 230 may include a control application specific integrated circuit (ASIC) 305, content-addressable memory (CAM) 310, and an action lookup table 320.

Control ASIC 305 may generally orchestrate or perform control functions for accessing CAM 310 and action lookup table 320. Control ASIC 305 may, for instance, form a search key for CAM 310 and input the search key to CAM 310. Control ASIC 305 may also control the lookup into action lookup table 320. Control ASIC 305 may also handle the updating or programming of CAM 310 and action lookup table 320.

A CAM, in general, is a type of associative computer memory that is designed for high-speed searching applications. Unlike standard random access computer memory in which the memory returns a data word based on a supplied address, CAM 310 may be designed such that, in response to a data word, CAM 310 may perform a parallel search of its entire memory to determine if that data word is stored. If the data word is found, CAM 310 may return a list of the storage addresses where the data word was found.

In one implementation, CAM 310 may particularly be a ternary CAM (TCAM). A TCAM is a CAM that allows states in the CAM to be specified as "don't care" states. For example, a TCAM might have an entry such as "10XX0," where "X" indicates the "don't care" state. This entry will match any of the four search keys: "10000," "10010," "10100," or "10110." TCAMs may be implemented in which two entries are written to the TCAM for each search item: a first entry corresponding to the pattern that is to be matched and a second "mask" entry that specifies which fields in the first entry are "don't care" states. For instance, for the example entry "10XX0," two values may be written to the TCAM. The first value may be the pattern "10110," where the "11" in the pattern can be set to any value (e.g., "11", "01", "10", or "00"). The second value may be the mask entry "00110", where a "1" indicates that the corresponding data in the pattern is to be masked (i.e., it is a "don't care" state).

The address of the highest priority match that corresponds to a particular search key may, after output by CAM 310, be input to action lookup table 320 to obtain an action corresponding to the match. The action may be, for example, drop (discard) the corresponding data unit, accept (i.e., pass or do not drop) the data unit, increment a counter, or other actions. The action may then be implemented by a subsequent section of hardware portion 230 or by software portion 220.

Exemplary operations that may be performed by control ASIC 305 are shown in control ASIC 305 as CAM key generation component 306, CAM lookup component 307, fetch action component 308, and perform action component 309. Each component 306, 307, 308, and 309 may correspond to a specific portion of control ASIC 305. Each of these actions may be performed by control ASIC 305 for each received data unit. CAM key generation component 306 may generate a search key corresponding to the data unit. For example, for a packet, a key may be constructed that includes portions that represent: a source port for the packet, a destination port for the packet, a source Internet Protocol (IP) address for the packet, and a destination IP address for the packet. The key may be input to CAM 310, which may return a list of all the entries in CAM 310 that match the key. CAM lookup 307 may control the input of the key to CAM 310.

Control ASIC 305, through CAM lookup component 307, may fetch the action for the data unit based on the lookup into CAM 310. The result of the lookup into CAM 310 may then be used by fetch action component 308 to fetch the action that is to be performed on the data unit from action lookup table 320. Perform action component 309 may then perform this action on the data unit. As previously mentioned, the action may include, for instance, dropping the data unit, accepting (i.e., not dropping) the data unit, or incrementing a counter based on the data unit.

In summary, the operation of firewall 200 may include receiving a data unit (e.g., a packet), constructing a search key based on fields of the data unit, looking up the search key in CAM 310, and performing an action on the data unit based on the result of the lookup.

Figure 4:
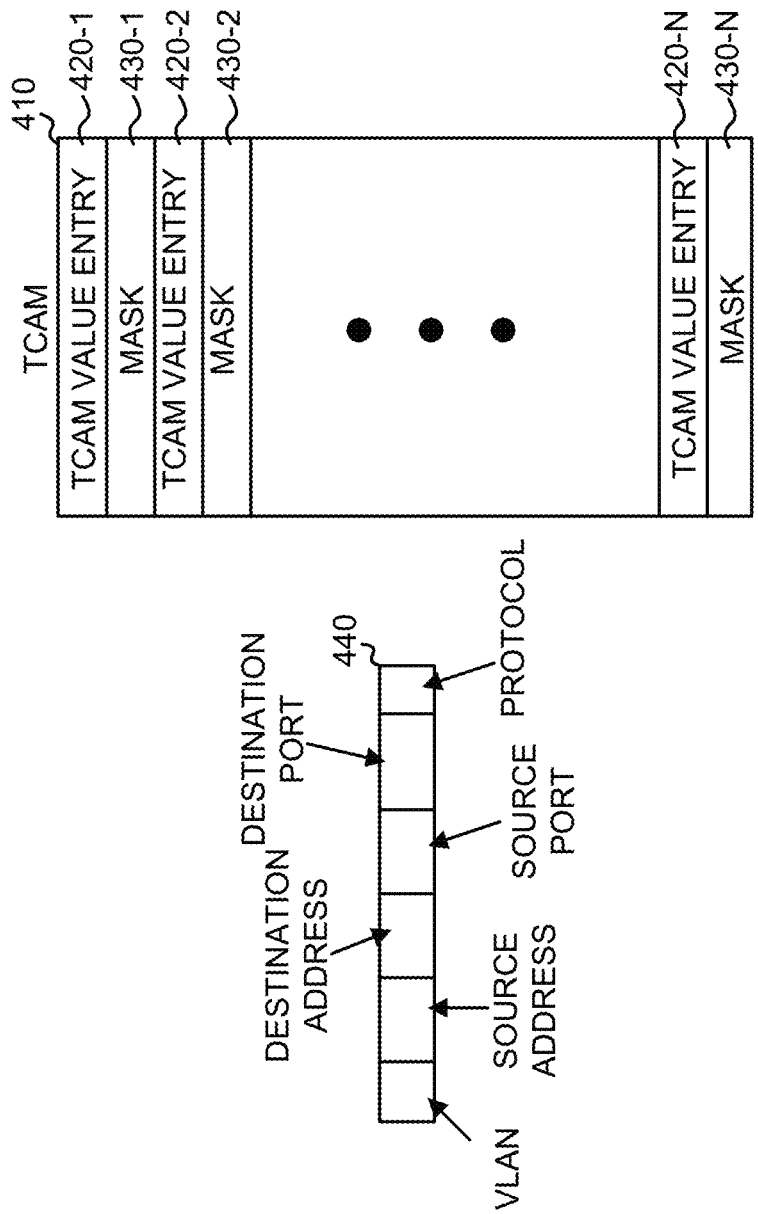
FIG. 4 is a diagram illustrating an exemplary implementation of a content-addressable memory (CAM)

FIG. 4 is a diagram illustrating an exemplary implementation of CAM 310. In this example, CAM 310 is a TCAM, labeled as TCAM 410. TCAM 410 may include a number of TCAM value entries 420-1 through 420-N. Each TCAM value entry 420 may be associated with a corresponding mask field 430-1 through 430-N. The data to store in each TCAM value entry 420 and each mask field 430 may be programmed into TCAM 410 during, for example, configuration of firewall 200.

In the example of FIG. 4, an input search key 440 is constructed based on portions of an IP packet and includes fields based on the incoming virtual LAN (VLAN), source address, destination address, source port, destination port, and protocol. A number of other possible fields could be included in search key 440. In some implementations, the particular fields that are to be used in a search key for firewall 200 may be programmable by the end user. Each incoming packet may have a search key 440 constructed for the packet. The entire search key may then be simultaneously applied to each of TCAM value entries 420. Mask fields 430 may be applied to select which bits of each entry must match and which can be ignored. If all of the values match in all of the bit locations that are unmasked, then the corresponding entry of TCAM 410 may be considered to be a match. If multiple entries in TCAM 410 are determined to be matches, TCAM 410 may apply a priority selection scheme to output the highest priority match. For instance, value entry 420-1 may be the highest priority entry, value entry 420-2 may be the next highest priority entry, and so forth.

Firewall 200, and hence TCAM 410, may operate on a packet-by-packet basis. That is, each received packet may be looked-up in TCAM 410 and an action performed for the packet based on the lookup.

In one particular implementation, TCAM 410 may be able to store and process up to approximately 14 thousand entries simultaneously, where each value entry may have a width of 24 bytes. It can be appreciated that the particularly described configuration and logical operation of TCAM 410 is exemplary.

Network Device Operation

The operation of firewall 200 in controlling hardware portion 230 to process traffic flows according to user defined filters will now be described with reference to FIGS. 5-8.

FIG. 5 is a flow chart illustrating exemplary operations through which firewall 200 may configure hardware portion 230. For the discussion of FIG. 5, assume firewall 200 uses TCAM 410 to implement the filtering rules.

A user of firewall 200 may create a filter that reflects the policies that the user would like to implement. Firewall 200 may receive the filter definition (block 510). The filter may be, for example, a text file created by the user.

FIGS. 6A and 6B are diagrams illustrating an exemplary firewall filter "F1". As shown in FIG. 6A, filter F1 600 may include one or more terms labeled as terms T1, T2, and T3. Each term may be a collection of match conditions and the corresponding actions that are to be taken if the match conditions are met. Each match condition may be specified as an attribute (e.g., source address, destination address, receive port, etc.) and a corresponding value for the attribute. The terms may have a logical OR relationship among themselves and the order of the terms may be relevant to the implementation of the filter. For instance, if terms T1 and T2 are satisfied, the action corresponding to the higher priority term (e.g., T1) will be performed and the action corresponding to the lower priority term (e.g., T2) will not be performed. Typically, terms occurring first in a filter have higher priority over later occurring terms.

FIG. 6B is a diagram illustrating the terms of filter F1 600 in additional detail. In particular, exemplary match conditions and actions corresponding to each term T1, T2, and T3 are shown.

As shown in FIG. 6B, term T1 includes two match conditions 610 and 615, and an action 620. Each of match conditions 610 and 615 may be specified using the term "match" followed by a match attribute and a match value. Match condition 610, for instance, specifies the attribute "IP Source Address" and the value "1.1.1.1." In other words, for this condition to be satisfied, the source IP address for a data unit should be "1.1.1.1". Match condition 615 specifies the match attribute "source port" and the value "100." Thus, for this condition to be satisfied, the source port for the data unit should be 100. If both match conditions 610 and 615 are satisfied, action 620 may be performed by firewall 200. In this case, action 620 specifies that a counter corresponding to the term is to be incremented.

Match conditions 610 and 615 may be assumed to have a logical "AND" relationship between them, meaning that both conditions should be satisfied for action 620 to be performed. Term T1 will eventually be represented in TCAM 410. Because the relationship between the match conditions in term T1 are all logical "AND" conditions, term T1 may be represented as a single entry value in TCAM 410.

Consider term T2 in FIG. 6B. Term T2 includes four match conditions 630, 635, 640, and 645. Term T2 also includes an action 650 (discard the data unit). In general, match attributes in a filter term may be combined using a logical AND operation. Match condition 630 and 635, however, each specify the same attribute ("IP Source Address") but include different values for the attributes. In this situation, if each match condition 630, 635, 640, and 645 were combined in a logical "AND" relationship, the term would not make sense, as it cannot have two different values for its source IP address. Consistent with aspects described herein, in this situation, firewall 200 may assume that the user intends match conditions 630 and 635 to be specified as match conditions that have a logical OR relationship with one another. In this case, the expression (i.e., logical rules) to represent term T2 would thus be: (match condition 630 OR match condition 635) AND match condition 640 AND match condition 645.

Referring back to FIG. 5, firewall 200 may next parse the received filter to generate the logical rules embodied by the filter (block 515). Parsing the entries may generally include determining all of the attribute-value pairs for a filter term and determining the logical combining condition (AND or OR) that applies to the attribute-value pair. In other words, as discussed above with respect to FIG. 6B, this may include locating the match conditions for each term in the filter and determining whether the various match conditions can be combined as a logical AND condition or a logical OR condition. As will be described in more detail below, terms in the filter with logical OR conditions (e.g., term T2) may be expanded by firewall 200 into sub-terms such that each sub-term is a logical rule that is made of a set of pure logical AND conditions.

The logical rules determined in block 510 may next be converted to entries that may be written to TCAM 410 (block 520). More specifically, attribute-value pairs that are part of each logical rule determined in block 515 may be inserted into a TCAM value entry 420 where the value is placed in a field corresponding to the attribute for the field. A mask entry 430 may also be generated for each value entry 420 such that conditions not specified in the filter term are marked as "don't care" conditions.

Figure 7:
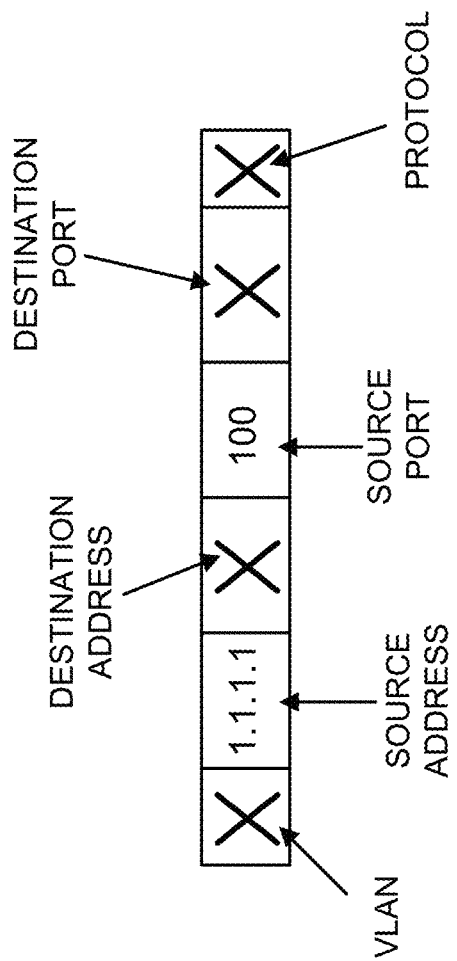
FIG. 7 is a diagram illustrating the representation of a term in a ternary CAM (TCAM)

FIG. 7 is a diagram illustrating the representation of term T1 (FIG. 6B) in TCAM 410 using the search format shown for search key 440 (FIG. 4). The VLAN field, destination address field, destination port field, and protocol field may be don't care ("X") conditions, as term T1 does not specify any particular value for these fields. The source address field and source port field, however, are set to the values indicated by match conditions 610 (source address) and 615 (source port). In FIG. 7, fields corresponding to actual values (i.e., source address and source port) and the don't care conditions are shown in a single graphical block. When physically implemented in TCAM 410, however, the source address and source port values may be written to TCAM 410 as part of a TCAM value entry 420 and the "don't care" conditions written to TCAM 410 as part of a corresponding mask entry 430.

The TCAM value entries 420 and mask entries 430 that are generated in block 520 may be written to TCAM 410 to program the firewall (block 530).

As previously mentioned, TCAMs, such as TCAM 410, typically are only capable of combining multiple match conditions using logical AND conditions for a single entry in the TCAM. Firewall 200, when parsing the filter to generate the TCAM entries (FIG. 5, block 520), may decompose match conditions in a term such that logical OR relationships within a term are represented as multiple entries in the TCAM.

Figure 8:
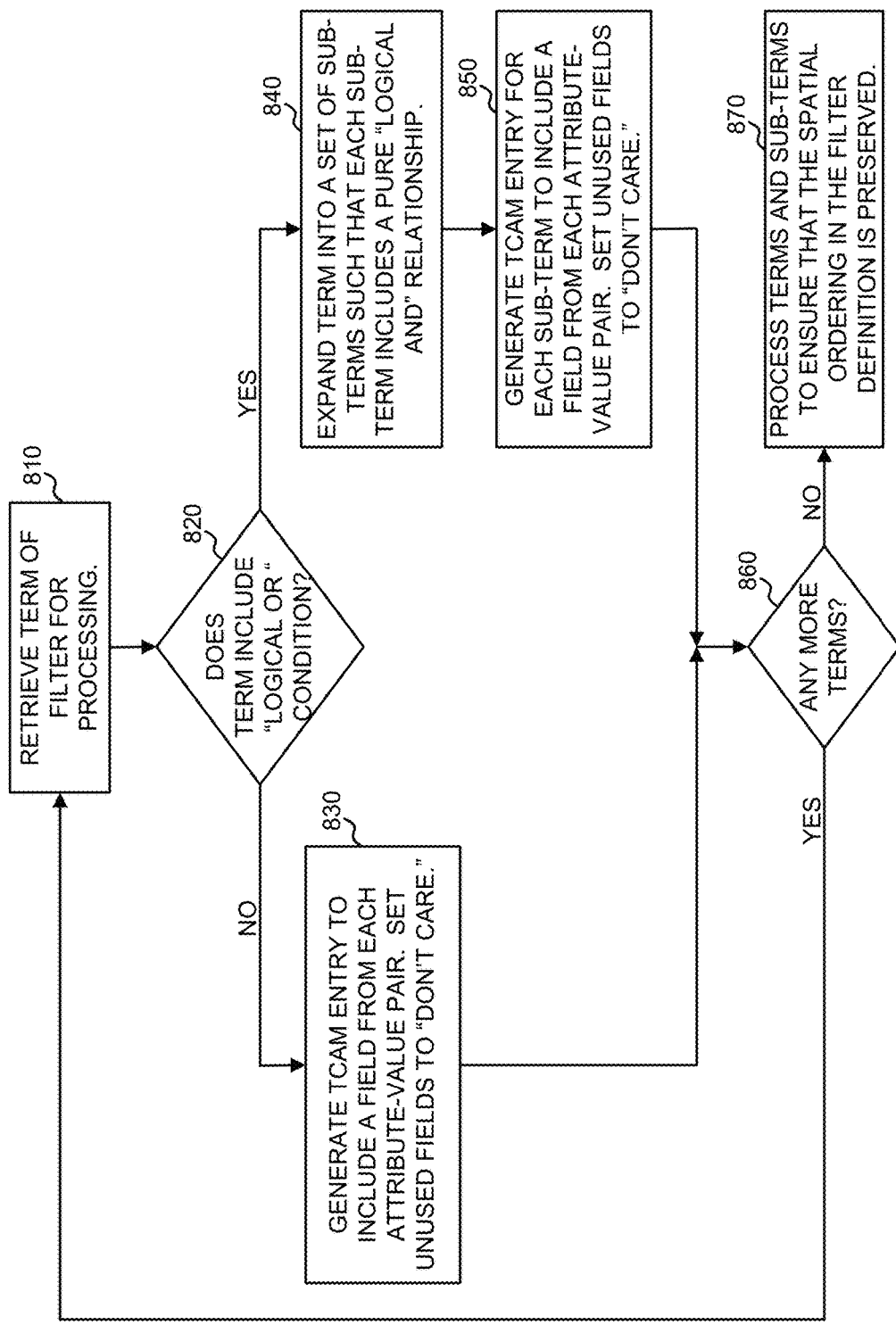
FIG. 8 is a flow chart illustrating exemplary parsing of a filter to generate TCAM entries.

FIG. 8 is a flow chart illustrating parsing of a filter to generate TCAM entries (block 520), in additional detail.

When parsing a filter, firewall 200 may process each term, such as terms T1, T2, and T3 (FIG. 6B), that makes up the filter (block 810). For each term, firewall 200 may determine whether the term includes logical OR conditions (block 820). As previously mentioned, terms that have multiple identical attributes, such as term T2 (two source address attributes) and term T3 (two source address attributes and two source port attributes), may have the identical attributes interpreted as a logical OR relationship between the attributes.

The TCAM entry for terms that do not include a logical OR relationship may be generated in which each field in the entry is based on the value of the corresponding attribute, where a "don't care" entry is applied for attributes that are not included in the term (block 830). An example of such an entry is shown in FIG. 7, where the two attributes specified for term T1 are included in a TCAM entry and the fields corresponding to non-specified entries are marked as "don't care" fields.

For each term (such as terms T2 and T3 in FIG. 6B) that include a logical OR relationship, firewall 200 may decompose each term into a set of sub-terms such that each sub-term includes a pure AND logical relationship (block 840). The sub-terms are related to one another in a logical OR relationship. Accordingly, each sub-term may be written to TCAM 410 as a different entry, where unused fields for the sub-terms are set to a "don't care" value (block 850).

As an example of decomposing a term into sub-terms, consider term T2. Term T2 may be composed into the two sub-terms: (1) IP source address 2.2.2.2 AND source port 200 AND protocol UDP, and (2) IP source address 3.3.3.3 AND source port 200 AND protocol UDP. Each sub-term may be stored as a separate entry in TCAM 410.

For each term, the number of sub-terms corresponding to the term is equal to the product of the number of different values of each attribute in the term. More formally, for each attribute of a term, define the "attribute count" as the number of different values that are being matched for the term. For term T2, the attribute counts are:
  IP source address=2;
  source port=1; and
  protocol=1.
The number of sub-terms for this term, also called the expansion factor herein, is the product of the attribute counts, which equals two (2×1×1) in this example.

For term T3, the attribute counts are:
  IP source address=2;
  source port=2; and
  destination port=1.
Accordingly, for term T3, there are four sub-terms (2×2×1). Each sub-term includes one attribute value from each of the three different attributes and the four sub-terms cover all possible combinations of the attribute values in which each attribute is represented once in each sub-term. The four sub-terms for T3 are: (1) IP source address 2.2.2.12 AND source port 200 AND destination port 220, (2) IP source address 2.2.2.12 AND source port 210 AND destination port 220, (3) IP source address 2.2.2.13 AND source port 200 AND destination port 220, and (4) IP source address 2.2.2.13 AND source port 210 AND destination port 220.

As a result of the decomposition of terms into sub-terms, there will be, for each term, N sub-terms, where N equals the expansion factor. Further, no two sub-terms of a term should be entirely identical. That is, each sub-term should differ from another by at least one attribute value. Additionally, no sub-term should contain more than one occurrence of each attribute. The number of times each attribute-value set occurs in the sub-terms will be equal to the expansion factor divided by the attribute count for that attribute.

Table I, below, lists pseudo-code for performing term expansion on a filter according to one exemplary implementation. In Table I, the terms "expansion factor," "expansion factor lower," and "expansion array" are used. Expansion factor may be calculated as the product of the attribute counts for a term. Expansion factor lower may be defined for a given term, $T_k$, as the expansion factor of the sub-filter, $F_{sub} = \{T_k, T_{k+1}, \ldots T_n\}$. In other words, the expansion factor lower is the product of the attribute counts of all terms including and below $T_k$. The expansion array may be defined as an array of sub-terms of size expansion factor.

TABLE I

```
Begin Do TermExpansion (Attribute, Attribute Count, Expansion factor
  Lower, Expansion Factor, Expansion Array)
    Value index = 0;
    /*
     * For each Attribute, get all values
     */
    While (value = get value ( Attribute, value index++) ) {
      /*
       * Calculate the start index for this attribute-value based on its
       * Attribute Count and Expansion Factor Lower
       */
      For (write_index_start = (value index * Expansion Factor Lower);
        write_index_start < Expansion factor,
        write_index_start = (write_index_start + (Expansion
          Factor Lower* Attribute Count) ) {
        /*
         * Starting from the Start Index, write this value into the
         * Sub Term List "Expansion Factor Lower" times
         */
        For (I = 0; I < Expansion factor Lower, i++) {
          write_index = write_index_start + i;
          Put value (Attribute, Expansion Array[write_index];
        }
      }
    }
End Do TermExpansion
```

Blocks 820, 830, 840, and 850 may be repeated by firewall 200 for each term in the filter (block 860). The generated TCAM entries corresponding to the terms and sub-terms may then be processed to ensure that spatial ordering of the filter definition is preserved (block 870). In general, TCAM entries generated for terms that occur earlier in a filter should be placed in a higher priority location within TCAM 410.

In one implementation, firewall 200 may preserve spatial ordering for terms and sub-terms by using rule extensions, where a rule extension may be a string appended to a sub-term entry. The appended strings may be chosen to indicate spatial ordering and firewall 200 may track the first and last sub-terms of each term in TCAM 410. When updating TCAM 410, firewall 200 may then ensure that the spatial order of the filter is preserved. For example, the two sub-terms of term T2 may be assigned the extension strings "T2.1" and "T2.2." When writing the resultant TCAM entries to TCAM 410, firewall 200 may ensure that all sub-terms that begin with the string "T2" have a lower priority in TCAM 410 than entries that begin with the string "T1."

Conclusion

Techniques for expanding terms in a filter so that the terms can be implemented as a series of logical AND operations were described. Filters that include intra-term OR conditions may thus be implemented in a TCAM in which each entry represents a search based on AND operations.

While a series of operations have been described with regard to FIGS. 5 and 8, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   identifying, by a device, a term of a filter,
      the term including information identifying a network address;
   expanding, by the device, the term into a set of sub-terms,
      the set of sub-terms being a logical expression of the term based on a logical OR condition;
   generating, by the device, an entry, of content-addressable memory, for a sub-term of the set of sub-terms,
      the sub-term including information identifying the network address;
   appending, by the device, a rule extension to the entry,
      the rule extension including first numerical information and second numerical information,
      the first numerical information being a first numerical value that corresponds to the term and indicates a priority of the term relative to another term, and
      the second numerical information being a second numerical value that corresponds to the sub-term and indicates a priority of the sub-term relative to another sub-term of the set of sub-terms;
   updating, by the device and based on the rule extension appended to the entry, the content-addressable memory in a manner that preserves a spatial ordering of the filter; and
   performing, by the device, an action on a packet, received via a network, using filtering rules implemented in the content-addressable memory.

2. The method of claim 1, where the rule extension is a string.

3. The method of claim 1, further comprising:
   generating another entry for another sub-term of the set of sub-terms; and
   appending another rule extension to the other entry.

4. The method of claim 3,
   where the other rule extension includes other numerical information that corresponds to the other sub-term.

5. The method of claim 1, where a quantity of sub-terms of the set of sub-terms is equal to a product based on a quantity of different values of an attribute in the term.

6. The method of claim 1, further comprising:
   determining an attribute count for the term based on a quantity of values that are being matched for the term,
      where expanding the term into the set of sub-terms comprises:
         expanding the term into the set of sub-terms based on the attribute count.

7. The method of claim 1, further comprising:
   determining two or more attribute counts for the term; and
   determining an expansion factor based on a product of the two or more attribute counts,
      where expanding the term into the set of sub-terms comprises:
         expanding the term into the set of sub-terms based on the expansion factor.

8. The method of claim 1, where the content-addressable memory is a ternary content-addressable memory.

9. The method of claim 1, where the sub-term includes a logical AND condition.

10. A system comprising:
a memory; and
one or more processors, at least partially implemented in hardware and communicatively connected to the memory, to:
identify a term of a filter,
the term including information identifying a network address;
generate an entry for a sub-term of a plurality of sub-terms of the term,
the sub-term including information identifying the network address, and
the plurality of sub-terms being a logical expression of the term based on a logical OR condition;
append a rule extension to the entry,
the rule extension including first numerical information and second numerical information,
the first numerical information being a first numerical value that corresponds to the term and indicates a priority of the term relative to another term, and
the second numerical information being a second numerical value that corresponds to the sub-term and indicates a priority of the sub-term relative to another sub-term of the plurality of sub-terms;
update, based on the rule extension appended to the entry, a ternary content-addressable memory (TCAM) in a manner that preserves a spatial ordering of the filter; and
perform an action on a packet, received via a network, using filtering rules implemented in the TCAM.

11. The system of claim 10, where the one or more processors are further to:
expand the term into the plurality of sub-terms before generating the entry.

12. The system of claim 11, where the one or more processors are further to:
determine that the term includes the logical OR condition before expanding the term into the plurality of sub-terms.

13. The system of claim 10, where the sub-term includes a logical AND condition.

14. The system of claim 10, where the one or more processors are further to:
set an unused field of the entry, for the sub-term, to a don't care value.

15. The system of claim 10, where the rule extension is a string.

16. The system of claim 10, where the one or more processors are further to:
generate another entry for the other sub-term; and
append another rule extension to the other entry.

17. A non-transitory computer-readable medium storing instructions, the instructions comprising:
one or more instructions that, when executed by at least one device, cause the at least one device to:
identify a term of a filter,
the term including information identifying a network address;
expand the term into sub-terms;
generate entries for sub-terms of the term,
the sub-terms being a logical expression of the term based on a logical OR condition,
the sub-terms including a sub-term, and
the sub-term including information identifying the network address;
append a rule extension to an entry of the entries,
the rule extension including first numerical information and second numerical information,
the first numerical information being a first numerical value that corresponds to the term and indicates a priority of the term relative to another term, and
the second numerical information being a second numerical value that corresponds to the sub-term and indicates a priority of the sub-term relative to another sub-term of the sub-terms;
update, based on the rule extension appended to the entry, a content-addressable memory in a manner that preserves a spatial ordering of the filter; and
perform an action on a packet, received via a network, using filtering rules implemented in the content-addressable memory.

18. The non-transitory computer-readable medium of claim 17, where a quantity of the sub-terms is equal to a product based on different values of attributes in the term.

19. The non-transitory computer-readable medium of claim 17,
where the instructions further comprise:
one or more instructions that, when executed by the at least one device, cause the at least one device to:
determine attribute counts for the term; and
determine an expansion factor based on a product of the attribute counts, and
where the one or more instructions to expand the term comprise:
one or more instructions that, when executed by the at least one device, cause the at least one device to:
expand the term into the sub-terms based on the expansion factor.

20. The non-transitory computer-readable medium of claim 17, where the sub-term includes a logical AND condition.

* * * * *